Nov. 17, 1925.
P. G. OETTEL
1,561,479
ADJUSTABLE FEED MECHANISM
Filed Nov. 1, 1924      3 Sheets-Sheet 1
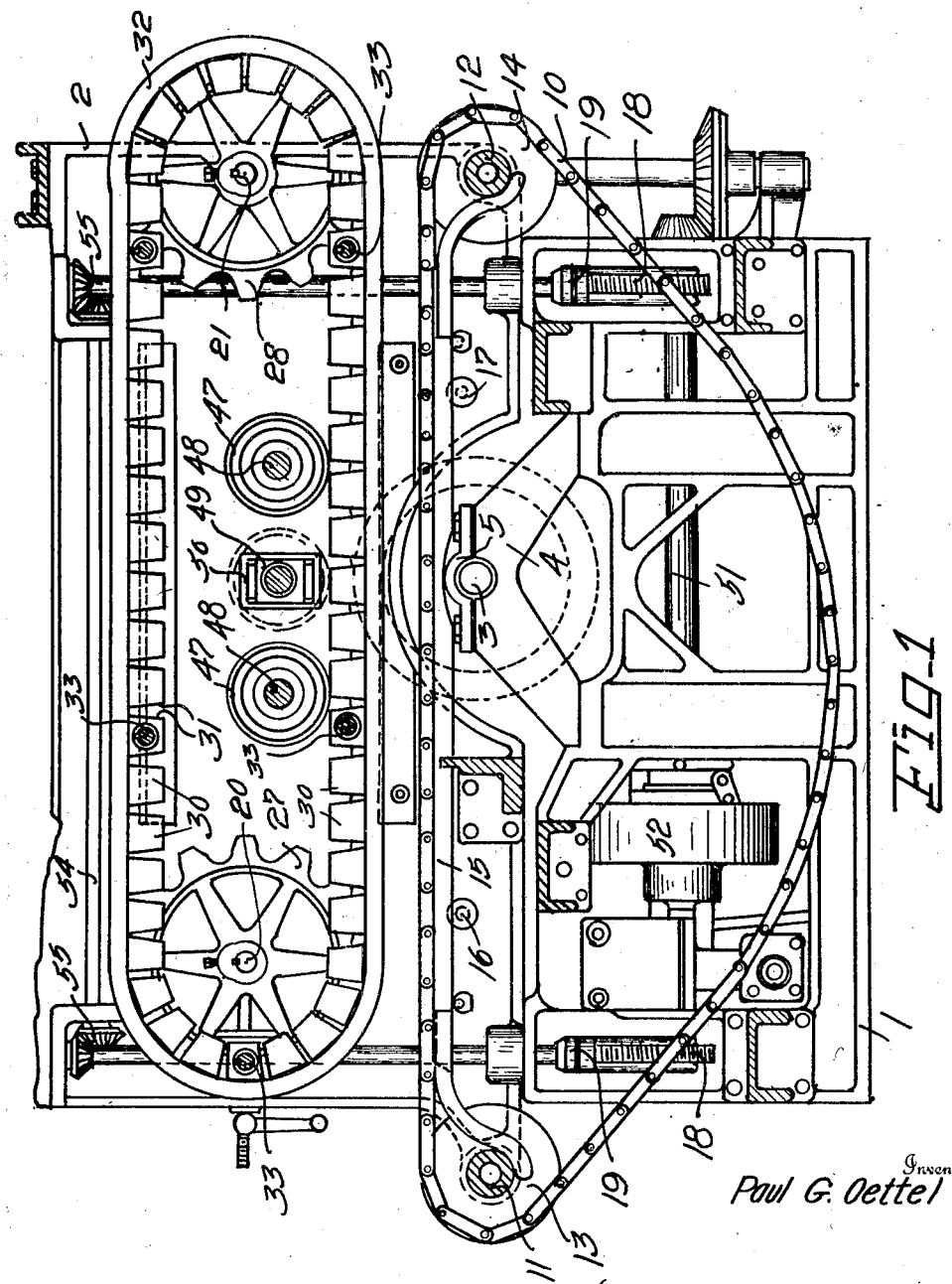
Inventor
Paul G. Oettel
By Herbert E. Smith
Attorney

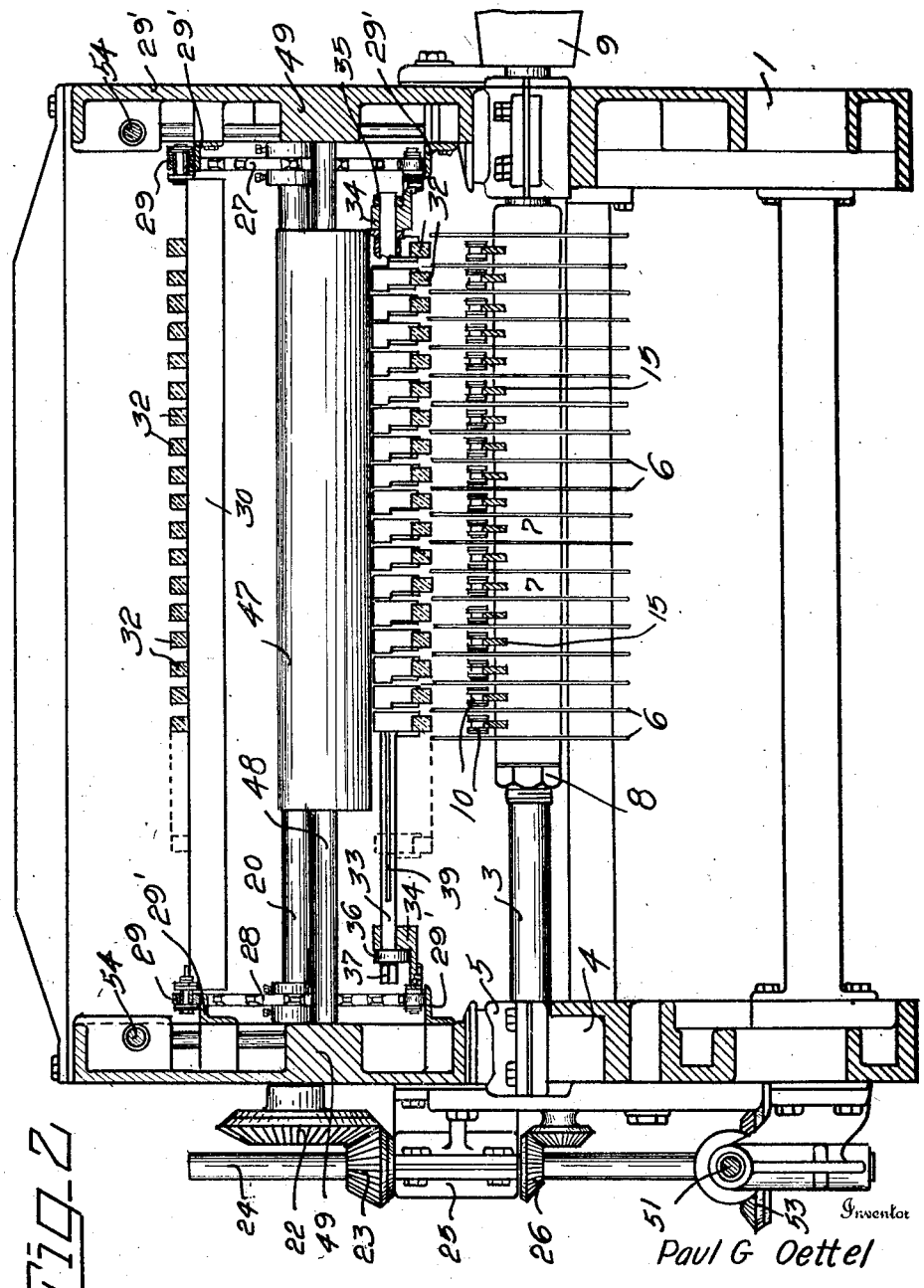

Nov. 17, 1925.
P. G. OETTEL
1,561,479
ADJUSTABLE FEED MECHANISM
Filed Nov. 1, 1924
3 Sheets-Sheet 3
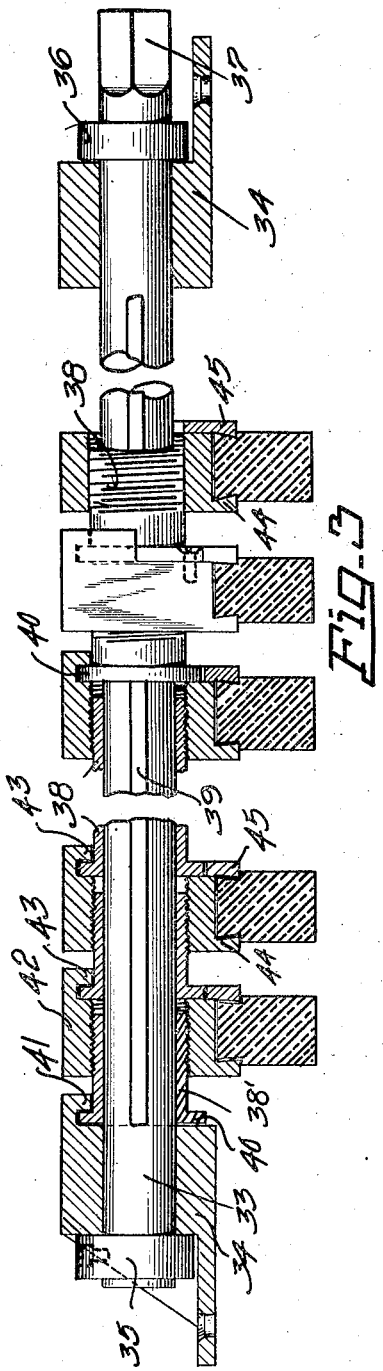
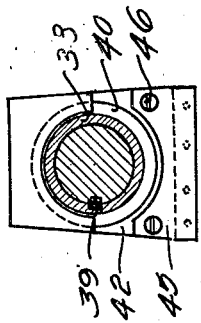
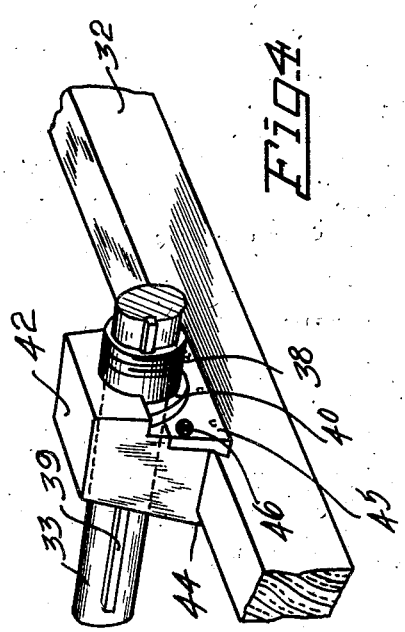
Inventor
Paul G. Oettel
By Herbert E. Smith
Attorney Patented Nov. 17, 1925.

1,561,479

UNITED STATES PATENT OFFICE.

PAUL G. OETTEL, OF SPOKANE, WASHINGTON.

ADJUSTABLE FEED MECHANISM.

Application filed November 1, 1924. Serial No. 747,235.

*To all whom it may concern:*

Be it known that I, PAUL G. OETTEL, a citizen of the United States, residing at Spokane, in Spokane County, and State of Washington, have invented certain new and useful Improvements in Adjustable Feed Mechanisms, of which the following is a specification.

The present invention relates to improvements in adjustable feed mechanism for sawing machines of the gang type wherein the material to be sawed is conveyed to the gang of rotary saws between a series of endless feed chains and a complementary series of endless pressure belts. The invention involves especially means whereby the pressure belts, which travel longitudinally of the machine and maintain the material on the travelling beds or chains during the sawing operation, may be moved or spaced laterally of the machine to accommodate wide or narrower cuts of the gang saw.

While the invention is applicable for use in machines adapted for the manufacture of various articles, for convenience of illustration and description I have shown in the accompanying drawings a match-block sawing machine, wherein a gang of adjustable saws is carried on a single arbor. A lower series of longitudinally moving, endless feed chains arranged in parallelism, is adapted to feed planks arranged transversely of the machine and of the saws, and a complementary series of endless strips forming part of a belt is employed to apply pressure to the planks. Thus the planks before being sawed into match-blocks, and the sawed match-blocks, are retained in the feed mechanism with a continuous, uniform and effective pressure while travelling through the machine.

The saws in the gang are spaced and held apart by the use of spacing collars; means are provided for laterally adjusting the feed chains; and separate means are provided for laterally adjusting the pressure strips or belt, as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention, but it will be understood that changes and alterations may be made therein within the scope of my claims without departing from the principles of my invention.

Figure 1 is a longitudinal vertical sectional view of a match block machine embodying my invention, parts being omitted for convenience of illustration.

Figure 2 is a transverse vertical sectional view of the machine.

Figure 3 is a detail view with parts in section, transversely of the machine, showing the means for adjusting the pressure strips of the upper feed belt.

Figure 4 is a detail perspective view showing the adjusting device in connection with one of the strips of the endless belt.

Figure 5 is a transverse vertical sectional view through one of the adjusting shafts with its connections.

In the preferred form of my invention as illustrated in the drawings the machine frame preferably comprises a stationary base portion 1, and a vertically movable upper frame section 2. In the base section the saw arbor 3 extends transversely of the machine and is supported by struts 4 in bearings 5. The gang of rotary saws 6 is secured on the arbor with spacing collars 7 between adjoining saws, said collars being removable and interchangeable as to width to permit adjustment of the saws for variations in the sizes of match-blocks to be cut, and a locking nut 8 is employed to retain the saws on the arbor in rigid relation.

In Figure 2 a portion of a driving pulley is indicated at 9 to which proper connections are made for driving the arbor 3 and thereby rotating the saws as the planks are fed longitudinally of the machine while in position transverse thereto. The successive planks are fed to the saws on a series of longitudinally extending endless feed chains 10, the working or upper flights of which pass between adjoining saws and the chains are suspended between the driving shaft 11 and a countershaft 12 on sprocket wheels 13 and 14 of these respective shafts. The working flights of the chains are supported on longitudinally disposed parallel, spaced guide bars 15 which are located between adjacent or adjoining saws, and the guide bars are in turn supported by transversely extending bars 16 and 17 arranged in pairs and adjustable to elevate or lower the chains.

The upper frame section 2 may be elevated for the purpose of gaining access to the saws for replacement and readjustment through the instrumentality of vertically arranged screw bars 18 that are movable in stationary nuts 19 of the lower frame section or base member 1.

The feeding head for the planks is supported in the upper frame section 2, and this head includes a pair of transversely arranged, spaced shafts 20 and 21 journaled in the upper section of the frame, and the driving shaft 20 at one end is provided with a bevel gear 22 that is driven from the complementary pinion 23 on the upright shaft 24 supported and journaled in bearings as 25. A gear couple 26 is also employed in connection with shaft 24 and sprocket shaft 11 for operating the latter.

Each shaft 20 and 21 has a pair of sprocket wheels as 27 and 28 keyed thereon, upon which the flexible belt indicated as a whole by the numeral 29 is supported, and angle bars of iron as 29', four in number, are employed to guide the suspended flexible belt. This belt co-acts with the lower feed chains 10 and is of sufficient width to extend across the interior of the machine and cover the length of the planks as they are presented to the saws.

The body of the flexible belt is composed of wood slats 30 preferably of oak which extend transversely of the machine and at their ends are secured in suitable manner to the endless chains forming the belt 29. The adjoining sides 31 of these slats are preferably beveled to form V-shape spaces to compensate for contraction of the belt as the slats pass around the end supports or sprocket wheels. The slats are beveled, or tapered in cross section, with their maximum width at the exterior or working face of the belt and their minimum width at the interior of the belt in order that the exterior face of the belt will present a smooth continuous surface. On this smooth exterior face of the belt and extending longitudinally of the machine in the direction of travel of the planks, are arranged a series of continuous, spaced, parallel friction strips 32 which may be of rubber or other suitable material and carried by the slats at the exterior of the belt. These strips as the belt travels are arranged in position complementary to and alined with the series of feed chains 10, and the strips as seen in Figure 2 pass along a plane between adjoining saws in close frictional contact with the transversely arranged planks from which the blocks are to be cut.

As the successive planks are carried through the machine that portion of the plank that is to be cut into a block as it passes between adjoining saws is retained in rigid position by means of the strip 32 which bears down on the plank as it is supported and conveyed by the feed chain 10, and the block is also retained for the required length of time to prevent the undesirable kick-back from the saws, as the blocks pass therefrom. The feed chains 10 are held inflexibly on their guide bars, but the flexible belt made up of the cross slats and flexible friction strips 32 bearing upon the planks compensates for any inequalities or irregularities in the planks, and insures a continuous and rigid retention of the planks as they are fed to the saws and as the blocks pass from the saws.

The cushioning friction strips 32 are retained on the exterior of the pressure belt in adjusted position relatively to one another as follows. The belt 29 is provided with a number, as five of similar adjusting devices interspersed throughout its length and substituted for a like number of the wood cross slats 30. Each of these devices as best seen in Figures 3, 4, and 5 comprises a shaft 33 having at its ends flanged bearing blocks 34 attached to the chains forming the belt 29, and a removable retaining collar 35 at one end. The other end of each shaft is provided with a fixed collar 36 and a squared end 37, the latter adapted to receive a wrench or other tool for turning the shaft to adjust the strips 32.

On the adjusting shaft are carried a number of exteriorly threaded bushings 38 equal in number to the number of strips 32 and a spline or key 39 on the shaft in connection with a keyway in each bushing, permits sliding movement of the bushings on the shaft and insures rotary movement of the bushings with the shaft.

All of the bushings rotate with the shaft and all of the bushings are capable of sliding movement on the shaft, with the exception of the first bushing 38' at the left end of the shaft in Figure 3. Each bushing is fashioned with an annular guide flange 40 at one end, and the bushing 38' is retained against longitudinal movement on the shaft by co-action with a retaining flange and groove 41 on one of the bearing blocks 34, as at the left end of the shaft, in Figure 3.

Upon each of the exteriorly threaded bushings is carried an adjusting nut 42 which is grooved and provided with a flange 43 for engagement with the annular flange on a complementary bushing, and it will be apparent that when the shaft 33 is turned all of the bushings will be turned with the shaft, bushing 38' however is retained as a non-traveling bushing. As this latter bushing is turned the first nut 42 is caused to move to the right, by the action of the complementary threads on the bushing and non-rotatable nut, longitudinally of the shaft. The longitudinal movement of the nut causes a similar longitudinal or slide movement of the second bushing on the keyed shaft, and the rotation of the second bushing with the shaft causes a longitudinal movement of the second non-rotatable nut. This movement is carried on throughout the length of the shaft between the bushings and their complementary nuts with the result that the nuts are uniformly spaced equidistant from one another throughout the length of the shaft.

The series of nuts on one shaft is thus alined with the series of nuts on the other shafts and the nuts of the five series are alined in series equal to the number of nuts on a shaft.

The complementary nuts on the five shafts are attached to strips 32 to move said strips as the nuts are adjusted, and each nut is provided with a fixed lug 44 and a removable, opposed lug plate 45 set in a groove of the nut and fastened thereto as by screws 46. The inner edge of each strip 32 is clamped between a fixed lug and a removable lug plate, preferably with a dovetail joint as best seen in Figure 3. From this description taken in connection with the drawings it will be apparent that by turning the five shafts 33 all of the strips may be moved uniformly and laterally to properly space the strips in alined relation with the feed chains beneath the planks, and of course each strip is alined with relation to the belt to form a continuous band located in a plane parallel with the longitudinal axis of the machine. The strips or cushion bands are thus adapted to be moved transversely of the machine to accommodate narrow or wider cuts in the plank to form various sizes of match blocks.

Downward pressure on the working flight of the pressure belt is furnished to hold the strips 32 in close frictional contact with the planks through a series of spaced roller weights or bearing rollers 47 beneath which the lower flight of the pressure belt passes. Each of these gravity rollers is provided with a shaft 48 journaled at its ends in bearing blocks 49 and the bearing blocks are vertically movable in guideways or slots 50 of the frame section 2. The rollers are of the required weight for imposing a predetermined load on the working flight of the pressure belt.

The operating mechanism of the machine includes a clutch shaft 51 seen in Figure 1 and a clutch device 52, the shaft being coupled to the vertical drive shaft 24 by a bevel gear coupling 53, for control of the feed mechanism.

For the purpose of adapting the machine for sawing a different length of match blocks or other articles, the upper section of the machine is first elevated preferably by manual power applied in suitable manner to the upright screw bars 18, four of which are employed, one at each corner of the rectangular shaped machine. The upper ends of these shafts or bars are coupled together by a pair of cross shafts 54 and bevel gear connections 55. After the upper section 2 has been elevated to the proper height the bearings for the saw arbor are removed and the saw arbor is bodily withdrawn therefrom. The clamping nut, the rotary saws and the spreaders or spacing collars are removed from the arbor and a different set of these devices is substituted therefor and the arbor replaced in operative position. The feed chains are also adjusted laterally of the sawing machine, and then the pressure strips are adjusted as described. By this arrangement of parts it will be apparent that the machine may quickly and with facility be accurately changed or converted for cutting different sizes of match blocks. The necessity for using one machine for each size of block is eliminated by the adaptability of the present machine for cutting various sizes of blocks, thus reducing the cost of equipment and also the cost of operating power.

Having thus fully described my invention what I claim as new and desire to secure by Letters Patent is—

1. In a machine of the character described a work feeding head comprising a flexible belt and driving means therefor, continuous strips on the exterior of said belt extending in the direction of travel of the work, and means for adjusting said strips laterally of the belt.

2. In a machine of the character described a work feeding head comprising a flexible belt and driving means therefor, continuous flexible strips on the exterior of the belt, and a plurality of devices forming part of the belt comprising means for adjusting said strips laterally of the belt.

3. In a gang sawing machine the combination with a series of laterally adjustable, spaced, parallel feed devices for supporting planks thereon, of a work feeding head comprising a flexible belt and driving means therefor, continuous strips on the exterior of the belt complementary to the series of feed devices, and means for adjusting said strips laterally of the belt.

4. In a gang sawing machine a work feeding head comprising a flexible belt composed of transverse slats and driving means for the belt, continuous friction strips on the exterior of the belt, and means for adjusting said strips laterally of the belt.

5. In a gang sawing machine a work feeding head comprising spaced sprocket wheels and endless, spaced chains, transverse slats carried by said chains, continuous friction strips on the exterior of the belt, and means for adjusting said strips laterally of the belt.

6. In a machine as described a work feeding head comprising a flexible belt composed of slats and side chains thereon, supporting sprockets for said chains, said slats having V-shaped grooves therebetween, longitudinally extending continuous friction strips on the exterior of said belt, and means for relatively adjusting said strips laterally of the belt.

7. In a gang sawing machine a work feeding head comprising a flexible belt and driving means therefor, spaced friction strips on the exterior of the belt, gravity rollers at the inner side of the working flight of the belt for imposing a weight thereon, and means for relatively adjusting said strips laterally of the belt.

8. The combination in a work feeding head including a series of spaced strips, of an adjusting shaft, a spacing device attached to each strip, a complementary adjusting device for each spacing device on said shaft, and co-acting means on adjoining spacing and adjusting devices whereby the adjusting devices are moved when the shaft is turned.

9. The combination in a work feeding head including a series of spaced strips, of an adjusting shaft, a spacing device attached to each strip, a complementary adjusting device for each spacing device on said shaft, co-acting on adjoining spacing and adjusting devices for co-operatively connecting said spacing devices and adjusting devices, and means whereby the adjusting devices are moved when the shaft is turned.

10. The combination in a work feeding head including a flexible belt and spaced friction strips on the exterior of the belt, of an adjusting shaft, a spacing device attached to each strip, a complementary adjusting device for each spacing device, and co-acting means on the spacing and adjusting devices whereby the adjusting devices are moved when the shaft is turned.

11. The combination in a work feeding head including a series of spaced strips, of an adjusting shaft, a spacing nut attached to each strip, a complementary threaded adjusting bushing for each nut on the shaft, and co-acting means on the nuts and bushings whereby said nuts are moved as the shaft is turned for adjusting said strips.

12. The combination in a work feeding head including a series of spaced strips, of an adjusting shaft, a spacing nut attached to each strip and provided with a groove and flange, a complementary threaded bushing for each nut and an annular flange on each bushing for co-action with a nut, and means whereby said nuts are moved when the shaft is turned.

13. The combination in a work feeding head including a series of spaced, adjustable strips, of an adjusting shaft having a key thereon, a spacing nut attached to each strip and provided with a groove and flange, a complementary threaded bushing for each nut having a keyway, and an annular flange on each bushing for co-action with a groove and flange on a complementary nut.

In testimony whereof I affix my signature.

PAUL G. OETTEL.